(12) United States Patent
Fujita et al.

(10) Patent No.: US 9,613,366 B2
(45) Date of Patent: Apr. 4, 2017

(54) INFORMATION DISTRIBUTION METHOD, INFORMATION DISTRIBUTION SERVER, AND CHARGING DEVICE

(71) Applicant: FUJIFILM Corporation, Tokyo (JP)

(72) Inventors: Koudai Fujita, Saitama (JP); Ryousuke Itou, Saitama (JP); Junji Hayashi, Saitama (JP); Masanari Asano, Saitama (JP); Takeshi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/593,721

(22) Filed: Jan. 9, 2015

(65) Prior Publication Data

US 2015/0127462 A1 May 7, 2015

Related U.S. Application Data

(63) Continuation of application No. PCT/JP2013/062457, filed on Apr. 26, 2013.

(30) Foreign Application Priority Data

Jul. 10, 2012 (JP) ................................. 2012-154705

(51) Int. Cl.
  *G06Q 30/00* (2012.01)
  *G06Q 30/02* (2012.01)
  (Continued)

(52) U.S. Cl.
  CPC ..... *G06Q 30/0267* (2013.01); *G06Q 30/0269* (2013.01); *H02J 7/0004* (2013.01); *H02J 7/025* (2013.01)

(58) Field of Classification Search
  CPC combination set(s) only.
  See application file for complete search history.

(56) References Cited

U.S. PATENT DOCUMENTS 7,522,574 B2 * 4/2009 Biagioni ............. H04W 76/002
  370/310
8,811,901 B2 * 8/2014 Shionoiri ................ H02J 17/00
  455/41.2

(Continued)

FOREIGN PATENT DOCUMENTS

JP 20077329983 A 12/2007
JP 2009-141991 A 6/2009

(Continued)

OTHER PUBLICATIONS

German Office Action dated Jul. 28, 2015, issued in corresponding German Patent Application No. 11 2013 003 492.1.

(Continued)

*Primary Examiner* — Matthew T Sittner
(74) *Attorney, Agent, or Firm* — Birch, Stewart, Kolasch & Birch, LLP

(57) ABSTRACT

An information distribution server 50 acquires owner information on owners of a plurality of electronic devices 1 charged by a charging device 20 from the electronic devices 1 through the charging device 20, determines a configuration of a group constituted by a plurality of owners who are charging the electronic devices 1 by the charging device 20, by using the plurality of pieces of acquired owner information, acquires information corresponding to the determined configuration of the group from a database 40 that stores information according to a configuration of a group constituted by a plurality of owners, and causes the acquired information to be transmitted to the electronic devices 1 charged by the charging device 20 from the charging device 20.

8 Claims, 8 Drawing Sheets

(51) Int. Cl.
*H02J 7/00* (2006.01)
*H02J 7/02* (2016.01)

(56) References Cited

U.S. PATENT DOCUMENTS

| | | | | |
|---|---|---|---|---|
| 2002/0194072 A1* | 12/2002 | Blink | G06Q 20/202 | 705/15 |
| 2004/0085348 A1* | 5/2004 | Wang | H04L 41/22 | 715/735 |
| 2005/0170827 A1* | 8/2005 | Nagashima | G06F 8/65 | 455/419 |
| 2005/0230472 A1* | 10/2005 | Chang | G06Q 20/343 | 235/383 |
| 2007/0149255 A1* | 6/2007 | Luo | H02J 7/0004 | 455/573 |
| 2008/0252254 A1* | 10/2008 | Osada | H01M 10/0436 | 320/108 |
| 2008/0294798 A1* | 11/2008 | Lynch | H04M 1/72563 | 709/248 |
| 2009/0033280 A1* | 2/2009 | Choi | H02J 7/025 | 320/108 |
| 2009/0131121 A1* | 5/2009 | Ida | G06Q 30/02 | 455/572 |
| 2009/0144150 A1 | 6/2009 | Sakakibara et al. | | |
| 2009/0170569 A1* | 7/2009 | Anzai | H04M 1/72527 | 455/573 |
| 2010/0171461 A1* | 7/2010 | Baarman | H02J 5/005 | 320/108 |
| 2010/0188041 A1 | 7/2010 | Mizuo | | |
| 2010/0273507 A1* | 10/2010 | Coupe | H04W 24/10 | 455/456.1 |
| 2010/0324955 A1* | 12/2010 | Rinehart | G06Q 10/0637 | 705/7.36 |
| 2011/0043327 A1 | 2/2011 | Baarman et al. | | |
| 2011/0078092 A1* | 3/2011 | Kim | B60L 11/1824 | 705/412 |
| 2011/0320832 A1* | 12/2011 | Boss | G06F 1/266 | 713/310 |
| 2012/0115549 A1* | 5/2012 | Kim | H02J 7/0047 | 455/566 |
| 2012/0259723 A1* | 10/2012 | Ansari | B60L 11/1844 | 705/26.3 |
| 2012/0268247 A1* | 10/2012 | Boot | B60L 3/12 | 340/5.83 |
| 2012/0274275 A1* | 11/2012 | Baek | H02J 7/00 | 320/109 |
| 2015/0127462 A1* | 5/2015 | Fujita | G06Q 30/0267 | 705/14.64 |

FOREIGN PATENT DOCUMENTS

JP 2010-178498 A 8/2010
JP 2011-166355 A 8/2011

OTHER PUBLICATIONS

International Search Report, issued in PCT/JP2013/062457, dated Aug. 6, 2013.
Written Opinion of the International Searching Authority, issued in PCT/JP2013/062457, dated Aug. 6, 2013.
Written Opinion of the International Searching Authority, issued in PCT/JP2013/062457, dated Aug. 6, 2013 (Form PCT/ISA/237).

* cited by examiner

FIG. 4

| THE NUMBER OF GROUP MEMBERS | SEX COMPOSITION | SUBGROUP | | DISTRIBUTION INFORMATION |
|---|---|---|---|---|
| 2 TO 10 PEOPLE | MIXTURE OF MEN AND WOMEN | YOUNG AGE | THE NUMBER OF MEN>THE NUMBER OF WOMEN | J1 |
| | | | THE NUMBER OF MEN=THE NUMBER OF WOMEN | J2 |
| | | | THE NUMBER OF MEN<THE NUMBER OF WOMEN | J3 |
| | | MIDDLE AGE | THE NUMBER OF MEN>THE NUMBER OF WOMEN | J4 |
| | | | THE NUMBER OF MEN=THE NUMBER OF WOMEN | J5 |
| | | | THE NUMBER OF MEN<THE NUMBER OF WOMEN | J6 |
| | | OLD AGE | THE NUMBER OF MEN>THE NUMBER OF WOMEN | J7 |
| | | | THE NUMBER OF MEN=THE NUMBER OF WOMEN | J8 |
| | | | THE NUMBER OF MEN<THE NUMBER OF WOMEN | J9 |
| | MEN ONLY | YOUNG AGE | | J10 |
| | | MIDDLE AGE | | J11 |
| | | OLD AGE | | J12 |
| | WOMEN ONLY | YOUNG AGE | | J13 |
| | | MIDDLE AGE | | J14 |
| | | OLD AGE | | J15 |
| 11 OR MORE PEOPLE | MIXTURE OF MEN AND WOMEN | YOUNG AGE | THE NUMBER OF MEN>THE NUMBER OF WOMEN | J16 |
| | | | THE NUMBER OF MEN=THE NUMBER OF WOMEN | J17 |
| | | | THE NUMBER OF MEN<THE NUMBER OF WOMEN | J18 |
| | | MIDDLE AGE | THE NUMBER OF MEN>THE NUMBER OF WOMEN | J19 |
| | | | THE NUMBER OF MEN=THE NUMBER OF WOMEN | J20 |
| | | | THE NUMBER OF MEN<THE NUMBER OF WOMEN | J21 |
| | | OLD AGE | THE NUMBER OF MEN>THE NUMBER OF WOMEN | J22 |
| | | | THE NUMBER OF MEN=THE NUMBER OF WOMEN | J23 |
| | | | THE NUMBER OF MEN<THE NUMBER OF WOMEN | J24 |
| | MEN ONLY | YOUNG AGE | | J25 |
| | | MIDDLE AGE | | J26 |
| | | OLD AGE | | J27 |
| | WOMEN ONLY | YOUNG AGE | | J28 |
| | | MIDDLE AGE | | J29 |
| | | OLD AGE | | J30 |

FIG. 6

|  | CHARGING DEVICE ID | |
|---|---|---|
|  | 001 | 002 |
| OWNER INFORMATION | *** | *** |
|  | *** |  |
|  |  |  |
|  |  |  |
|  |  |  |
|  |  |  |
|  |  |  |
|  |  |  |

INFORMATION DISTRIBUTION METHOD, INFORMATION DISTRIBUTION SERVER, AND CHARGING DEVICE

CROSS REFERENCE TO RELATED APPLICATION

This is a continuation of International Application No. PCT/JP2013/062457 filed on Apr. 26, 2013, and claims priority from Japanese Patent Application No. 2012-154705, filed on Jul. 10, 2012, the entire disclosures of which are incorporated herein by reference.

TECHNICAL FIELD

The present invention relates to an information distribution method and program, and an information distribution server and a charging device which are used for the information distribution method.

BACKGROUND ART

In recent years, the performance and the usage frequency of portable terminals such as mobile phones, for example, smartphones, have become higher, and thus dissatisfaction with the carrying of a battery for the portable terminal has surfaced. A battery charger charging the battery of the portable terminal is classified into a wired battery charger that supplies power to the portable terminal in a wired manner and a wireless battery charger that supplies power to the portable terminal in a wireless manner.

In the wireless battery charger, it is unnecessary to perform an operation of connecting a charging cable to the portable terminal, and thus there is an advantage such as a neat appearance because of the absence of the charging cable. Because of such an advantage, it is considered that the wireless battery charger and a portable terminal corresponding to the wireless battery charger have become widespread, and thus various services using the wireless battery charger have been proposed (for example, see Patent Literature 1 to Patent Literature 3).

Patent Literature 1 discloses a system that provides charging power to portable terminals in a non-contact manner and identifies individual users of the portable terminals by using tag information of a non-contact tag attached to the portable terminals to thereby provide individual service for each user.

Patent Literature 2 and Patent Literature 3 disclose a system that specifies a user of an electric vehicle when a charging device and the electric vehicle are connected to each other and distributes advertisement information matched to the specified user to the electric vehicle.

CITATION LIST

Patent Literature

Patent Literature 1 JP-A-2007-329983
Patent Literature 2 JP-A-2011-166355
Patent Literature 3 JP-A-2009-141991

SUMMARY OF INVENTION

Technical Problem

According to the systems disclosed in Patent Literature 1 to Patent Literature 3, a user of an electronic device to be charged, such as a portable terminal or an electric vehicle, is provided with advertisement information useful for the user, and thus it is possible to expect an improvement in an advertisement effect.

However, in a system that recognizes individual users and distributes advertisement information optimized for each user, the construction of the system for determining information optimized for each user is costly, which may hinder the service from being provided.

The invention is contrived in view of such situations, and an object thereof is to provide an information distribution method and program capable of providing information suitable for a user who charges an electronic device without increasing cost, and an information distribution server and a charging device which are used for the information distribution method.

Solution to Problem

It is an information distribution method of the invention, of distributing information to an electronic device including a battery charged through wireless power feeding, a display unit displaying information, and a wireless communication unit, the information distribution method comprising: an owner information acquisition step of causing a computer to acquire owner information on owners of electronic devices from the electronic devices, the electronic devices being charged by at least one charging device that includes a communication unit communicating with the wireless communication unit of the electronic device and a charging unit capable of charging the batteries of a plurality of the electronic devices through wireless power feeding; a group configuration determination step of causing the computer to determine a configuration of a group constituted by a plurality of owners who are charging the electronic devices by the same charging device, by using the owner information acquired from the electronic devices charged by the same charging device; an information acquisition step of causing the computer to acquire information corresponding to the determined configuration of the group from a storage unit that stores information according to a configuration of a group constituted by a plurality of owners; and an information transmission step of causing the computer to transmit the information acquired in the information acquisition step to the electronic devices charged by the same charging device.

It is an information distribution program of the invention, for causing a computer to perform the steps of the information distribution method.

It is an information distribution server of the invention, used in a system that distributes information to an electronic device including a battery charged through wireless power feeding, a display unit displaying information, and a wireless communication unit, the information distribution server including: a computer that performs the steps of the information distribution method.

It is a charging device of the invention, used in a system that distributes information to an electronic device including a battery charged through wireless power feeding, a display unit displaying information, and a wireless communication unit, by using at least one charger that includes a communication unit communicating with a wireless communication unit of the electronic device and a charging unit capable of charging the batteries of the plurality of electronic devices through wireless power feeding, the charging device including: a network communication unit that communicates with an information distribution server distributing the information through a network; an owner information acquisition unit that acquires owner information on owners of the plurality of electronic devices who charge the batteries from the electronic devices; an owner information transmission control unit that causes the plurality of pieces of acquired owner information to be transmitted to the information distribution server from the network communication unit; an information reception unit that receives information determined by the plurality of pieces of owner information from the information distribution server; and an information transmission control unit that causes the received information to be transmitted to the plurality of electronic devices being charged from the communication unit.

Advantageous Effects of Invention

According to the invention, it is possible to provide an information distribution method capable of presenting information suitable for a user who charges an electronic device without increasing cost.

BRIEF DESCRIPTION OF DRAWINGS

FIG. 4 is a diagram showing an example of a table recorded in a database 40.

FIG. 6 is a diagram showing an example of a table recorded in a built-in memory of an information distribution server 50.

DESCRIPTION OF EMBODIMENTS

Hereinafter, an embodiment of the invention will be described with reference to the accompanying drawings.

Figure 1:
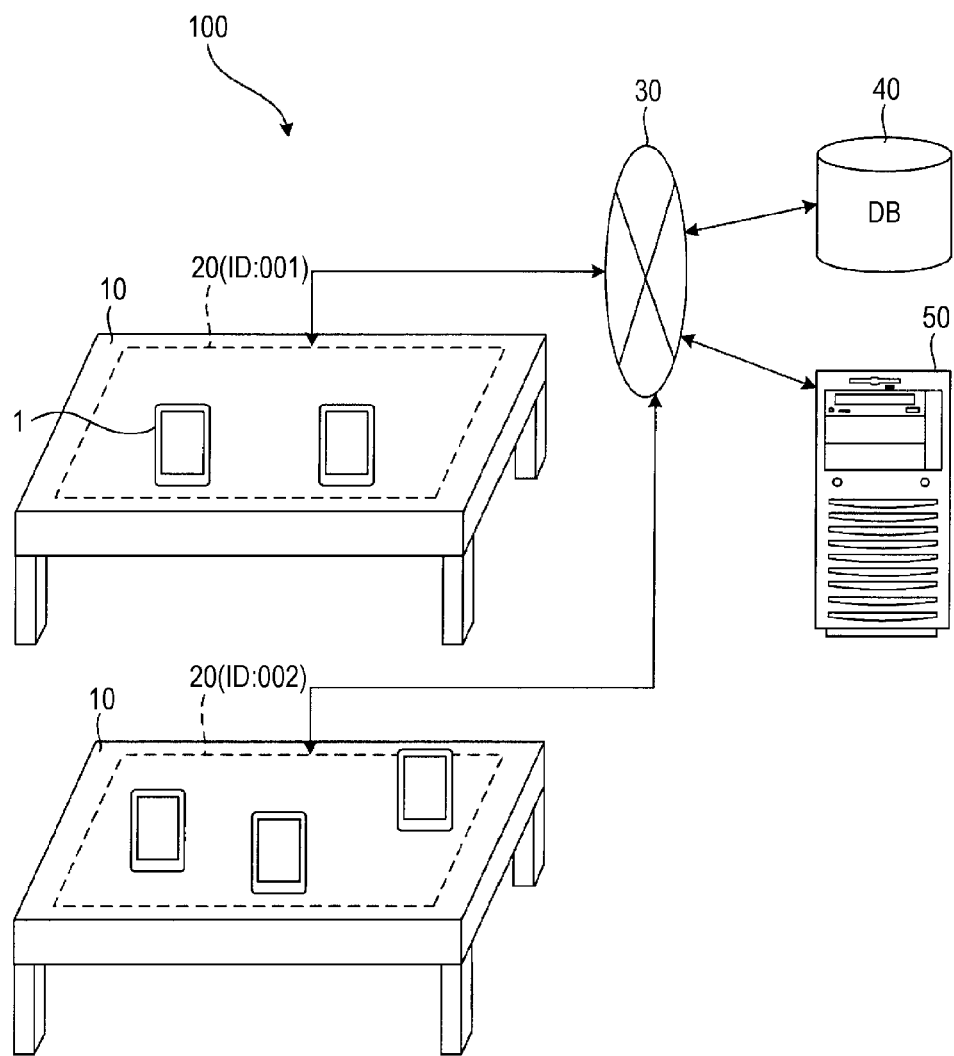
FIG. 1 is a diagram showing a schematic configuration of an information distribution system according to an embodiment of the invention.

FIG. 1 is a diagram showing a schematic configuration of an information distribution system according to an embodiment of the invention.

An information distribution system 100 includes a plurality of (two in the example shown in FIG. 1) tables 10 each in which a charging device 20 is embedded, a network 30 such as a LAN or the Internet, a database 40, and an information distribution server 50.

Each of the charging devices 20 and the network 30 are connected to each other in a wireless or wired manner. In addition, the database 40 and the information distribution server 50 are connected to the network 30 in a wireless or wired manner. The information distribution server 50 can have access to the database 40 through the network 30.

The table 10 is installed in a restaurant such as, for example, a café or a bar. FIG. 1 shows an example in which two tables 10 are installed within the same store. The charging device 20 built in each table 10 is a device that charges a battery of an electronic device 1 having a communication function such as a mobile phone, for example, a smartphone, a tablet terminal, a notebook PC, or a portable game machine, through wireless power feeding.

Figure 2:
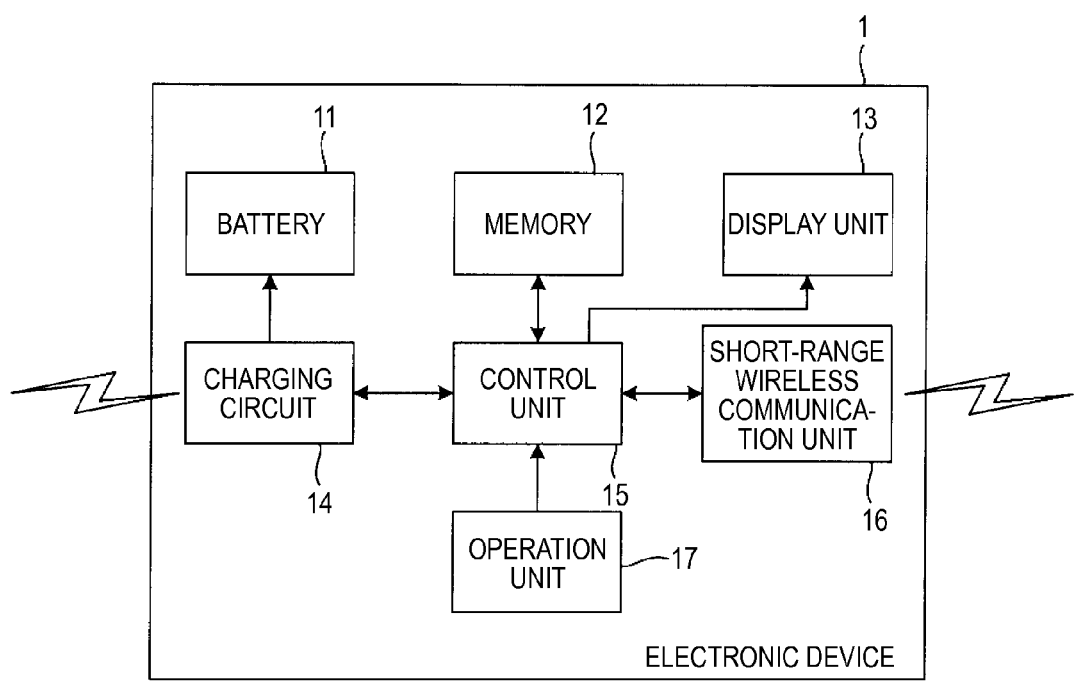
FIG. 2 is a diagram showing an internal configuration of an electronic device 1 in an information distribution system 100 shown in FIG. 1.

FIG. 2 is a diagram showing an internal configuration of the electronic device 1 which is used in the information distribution system 100 shown in FIG. 1.

The electronic device 1 includes a battery 11, a charging circuit 14 that charges the battery 11, a control unit 15 that controls the entire device, an operation unit 17 for performing various instructions on the control unit 15, a memory 12 that includes a RAM, a ROM, and the like, a display unit 13 that is constituted by a liquid crystal display, an organic EL, or the like, and displays various types of information, and a short-range wireless communication unit 16.

The charging circuit 14 includes a power reception coil and receives power supplied from a power feeding circuit 21 of the charging device 20 which will be described later in a wireless manner to thereby charge the battery 11 with the power.

The short-range wireless communication unit 16 is a unit that communicates with another device in a wireless manner without going through the network 30. The short-range wireless communication unit 16 is constituted by a communication module or the like based on a standard such as, for example, a non-contact IC or Bluetooth (registered trademark).

The memory 12 stores owner information on the owner of the electronic device 1. The owner information is information such as, for example, an owner ID, an owner's age, and an owner's sex for identifying an owner. The owner information can be input manually by operating the operation unit 17.

The control unit 15 performs control for transmitting the owner information stored in the memory 12 to the charging device 20 from the short-range wireless communication unit 16 in response to a request from the charging device 20.

Figure 3:
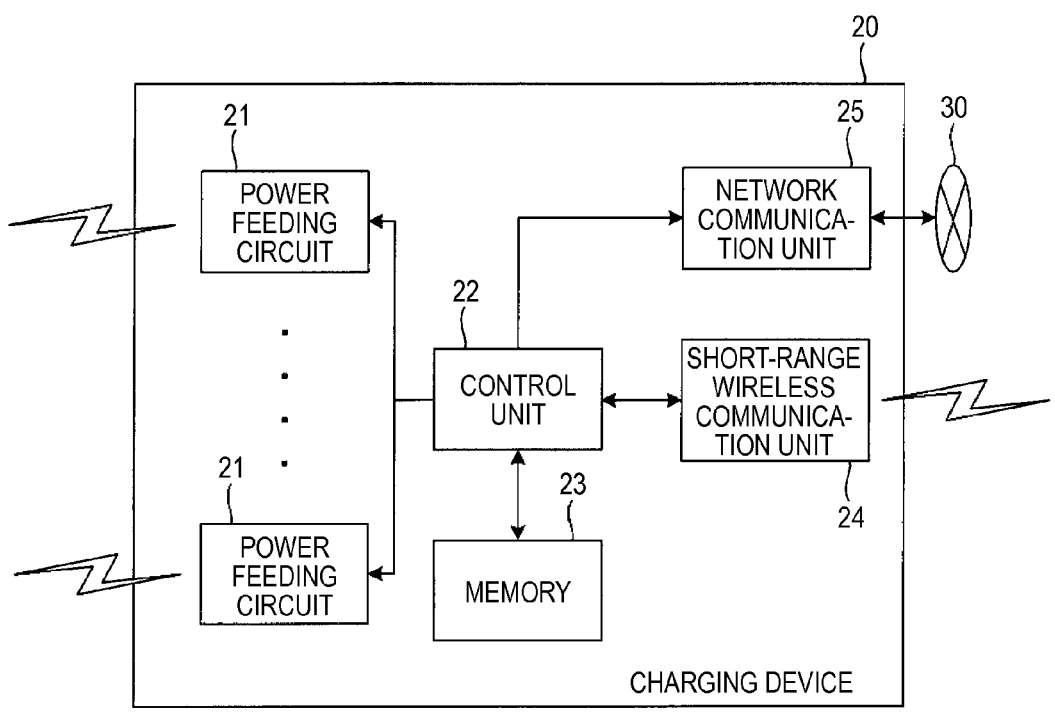
FIG. 3 is a diagram showing an internal configuration of a charging device 20 in the information distribution system 100 shown in FIG. 1.

FIG. 3 is a diagram showing an internal configuration of the charging device 20 which is used in the information distribution system 100 shown in FIG. 1.

The charging device 20 includes a plurality of power feeding circuits 21, a control unit 22 that controls the entire device, a memory 23 that includes a RAM, a ROM, and the like, a network communication unit 25, and a short-range wireless communication unit 24.

The power feeding circuit 21 includes a power feeding coil. The power feeding coils included in the respective power feeding circuits 21 are disposed two-dimensionally on the same surface within a top plate of the table 10. Any one of the plurality of power feeding coils and the power reception coil of the electronic device 1 overlap each other, and thus power is supplied to the power reception coil from the power feeding coil. As described above, in the table 10 used in the information distribution system 100, it is possible to simultaneously charge batteries of the individual electronic devices 1 by only placing the plurality of electronic devices 1 on the top plate.

The network communication unit 25 is a communication interface for communicating with another device through the network 30.

The short-range wireless communication unit 24 communicates with another device including the electronic device 1 without going through the network 30. The short-range wireless communication unit 24 is constituted by a communication module or the like based on a standard such as, for example, a non-contact IC or Bluetooth (registered trademark).

The control unit 22 communicates with the short-range wireless communication unit 16 of the electronic device 1 which is placed on the top plate of the table 10 by using the short-range wireless communication unit 24 to thereby acquire owner information on the owner of the electronic device 1 from the electronic device 1.

The memory 23 of the charging device 20 stores a charging ID which is identification information for identifying the charging device 20. The control unit 22 performs control for transmitting the charging ID and the owner information acquired from the electronic device 1 to the information distribution server 50 from the network communication unit 25.

In the database 40 of the information distribution system 100 shown in FIG. 1, distribution information suitable for a plurality of owners belonging to groups which can be utilized by users (owners of the electronic devices 1) using the information distribution system 100 is recorded for each of the groups. The distribution information is, for example, discount coupon information, an advertisement, or advertisement information of a store in which the table 10 is installed or another store.

FIG. 4 is a diagram showing an example of a table recorded in the database 40. In the example of FIG. 4, groups which can be utilized by a plurality of owners are divided into two groups (a group of 2 to 10 people and a group of 11 or more people) in accordance with the number of members. The groups are divided into a first group constituted by a mixture of men and women, a second group constituted by only men, and a third group constituted by only women. Each of the second group and the third group are divided into three subgroups (a young age group, a middle age group, and an old age group) in accordance with age groups of owners belonging to each of the second group and the third group.

In addition, the first group is divided into nine subgroups (a young age group in which the number of men is relatively large, a young age group in which the number of women is relatively large, a young age group in which the proportion of men is the same as that of women, a middle age group in which the number of men is relatively large, a middle age group in which the number of women is relatively large, a middle age group in which the proportion of men is the same as that of women, an old age group in which the number of men is relatively large, an old age group in which the number of women is relatively large, and an old age group in which the proportion of men is the same as that of women) in accordance with the age groups and the ratio of men to women of owners.

In addition, pieces of distribution information J1 to J30 suitable for owners belonging to the subgroups are recorded for each subgroup.

The table illustrated in FIG. 4 is recorded in advance in the database 40 by a manager of the information distribution system 100. The table data can be edited at any time by the manager.

An information distribution program is installed in the information distribution server 50 of the information distribution system 100 shown in FIG. 1. The information distribution program is executed by a processor (computer) within the information distribution server 50, and thus the information distribution server 50 functions as an owner information acquisition unit, a distribution information acquisition unit, and an information transmission control unit.

The owner information acquisition unit acquires owner information on an owner of the electronic device 1 which is charged by the charging device 20 from the electronic device 1 through the charging device 20.

The distribution information acquisition unit determines the configuration of a group constituted by a plurality of owners who are charging respective batteries of the electronic devices 1 using the charging device 20 from the owner information acquired through the same charging device 20, and acquires distribution information corresponding to the determined configuration of the group from the database 40. In other words, the distribution information acquisition unit acquires one piece of distribution information from the database 40 with respect to the same charging device 20.

The information transmission control unit transmits the distribution information acquired from the database 40 to the charging device 20 corresponding to the distribution information, and causes the distribution information to be transmitted from the short-range wireless communication unit 24 of the charging device 20 to the electronic device 1 which is charged by the charging device 20.

Next, an operation of the information distribution system 100 configured in the above-mentioned manner will be described.

Figure 5:
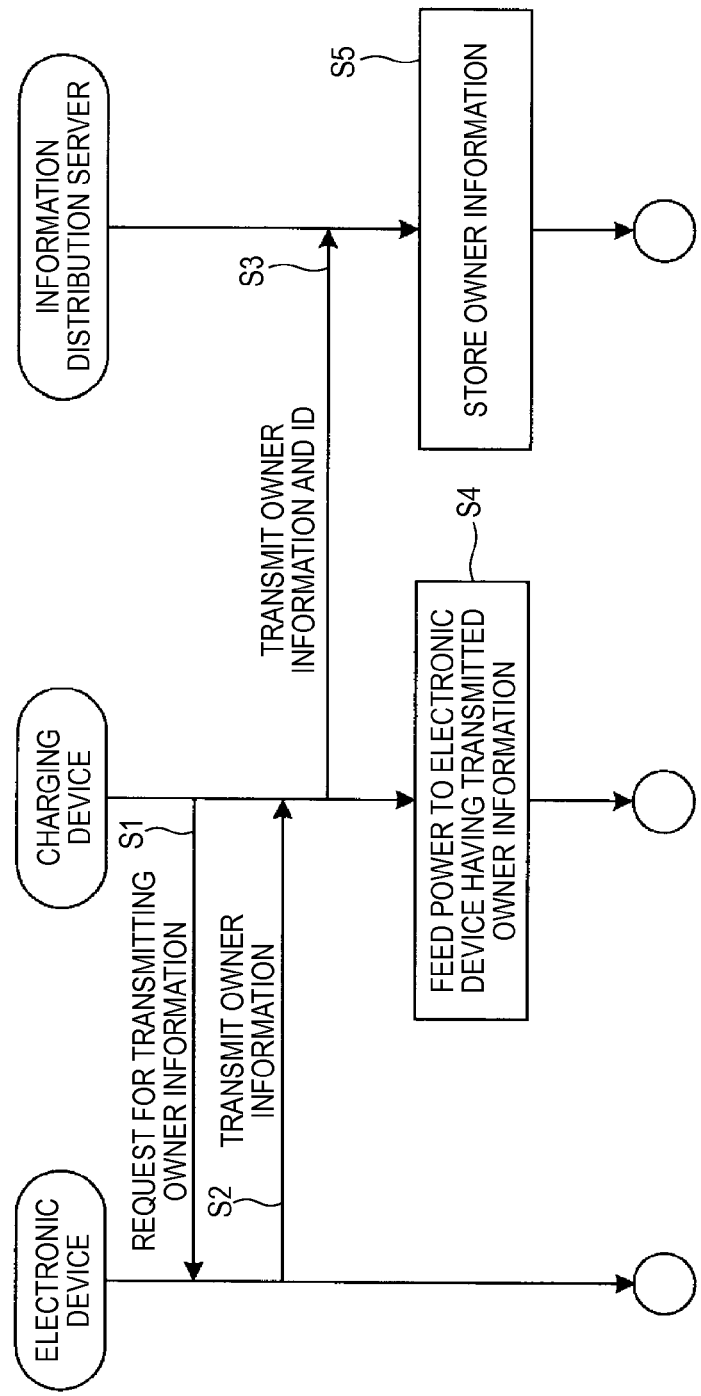
FIG. 5 is a sequence chart illustrating an operation of the information distribution system 100 shown in FIG. 1.

FIG. 5 is a sequence chart illustrating an operation of the information distribution system 100 shown in FIG. 1.

When the owner of the electronic device 1 places the electronic device 1 on the top plate of the table 10 in a state where the electronic device 1 is set in a wireless charging mode, the control unit 22 of the charging device 20 built in the table 10 detects that the electronic device 1 is placed on the table 10.

For example, a power-feeding request signal is transmitted to the charging device 20 from the electronic device 1 side by using the short-range wireless communication unit 16 and is received by the control unit 22 of the charging device 20, and thus the control unit 22 detects that the electronic device 1 is placed on the table 10. Alternatively, the control unit 22 may detect changes in a current or voltage which are generated in a power transmission coil when the power transmission coil the power reception coil approach each other, and thus the control unit may detect that the electronic device 1 is placed on the table 10.

When the control unit 22 of the charging device 20 detects that the electronic device 1 is placed on the table 10, the control unit causes a transmission request signal of owner information to be transmitted from the short-range wireless communication unit 24 to the electronic device 1 (step S1).

When the control unit 15 of the electronic device 1 receives the transmission request signal from the charging device 20, the control unit reads the owner information from the memory 12 and causes the owner information to be transmitted from the short-range wireless communication unit 16 to the charging device 20 (step S2).

When the control unit 22 of the charging device 20 receives the owner information from the electronic device 1, the control unit causes the received owner information and a charging ID of the charging device 20 which is stored in the memory 23 to be transmitted from the network communication unit 25 to the information distribution server 50 (step S3).

Thereafter, the control unit 22 of the charging device 20 starts feeding power to the power reception coil of the electronic device 1 by using the power feeding circuit 21 including the power transmission coil overlapping the power reception coil of the electronic device 1 transmitting the owner information (step S4).

When the information distribution server 50 acquires the owner information and the charging ID which are transmitted from the charging device 20, the information distribution server stores the owner information in a built-in memory in association with the charging ID (step S5).

Figure 6:
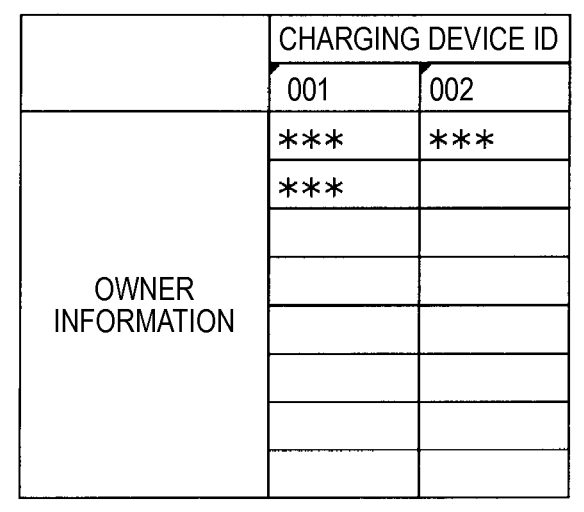

FIG. 6 is a diagram showing an example of a table stored in the built-in memory of the information distribution server 50. The charging ID (an ID 001 and an ID 002 because two charging devices 20 are shown in FIG. 1) of the charging device 20 which is used in the information distribution system 100 is stored in advance in the table shown in FIG. 6. When the information distribution server 50 acquires the owner information and the charging ID from the charging device 20, the information distribution server stores the owner information in a storage region corresponding to the acquired charging ID.

Although FIG. 5 shows an operation of only one electronic device 1, the processes of step S1 to step S5 are performed whenever the charging device 20 detects that a new electronic device 1 is placed on the table 10.

Meanwhile, when the electronic device 1 having owner information temporarily stored therein is removed from the table 10, the control unit 22 of the charging device 20 detects the removal of the electronic device and transmits a request for deleting the owner information of the removed electronic device 1 to the information distribution server 50, and thus the information distribution server 50 deletes the owner information from the built-in memory.

As shown in FIG. 1, two electronic devices 1 are placed on the table 10 in which the charging device 20 having the ID 001 is built in, and three electronic devices 1 are placed on the table 10 in which the charging device 20 having the ID 002 is built in. A case where the charging of all the electronic devices 1 is started is considered. In this case, the built-in memory of the information distribution server 50 stores two pieces of owner information corresponding to the ID 001 and three pieces of owner information corresponding to the ID 002.

Figure 7:
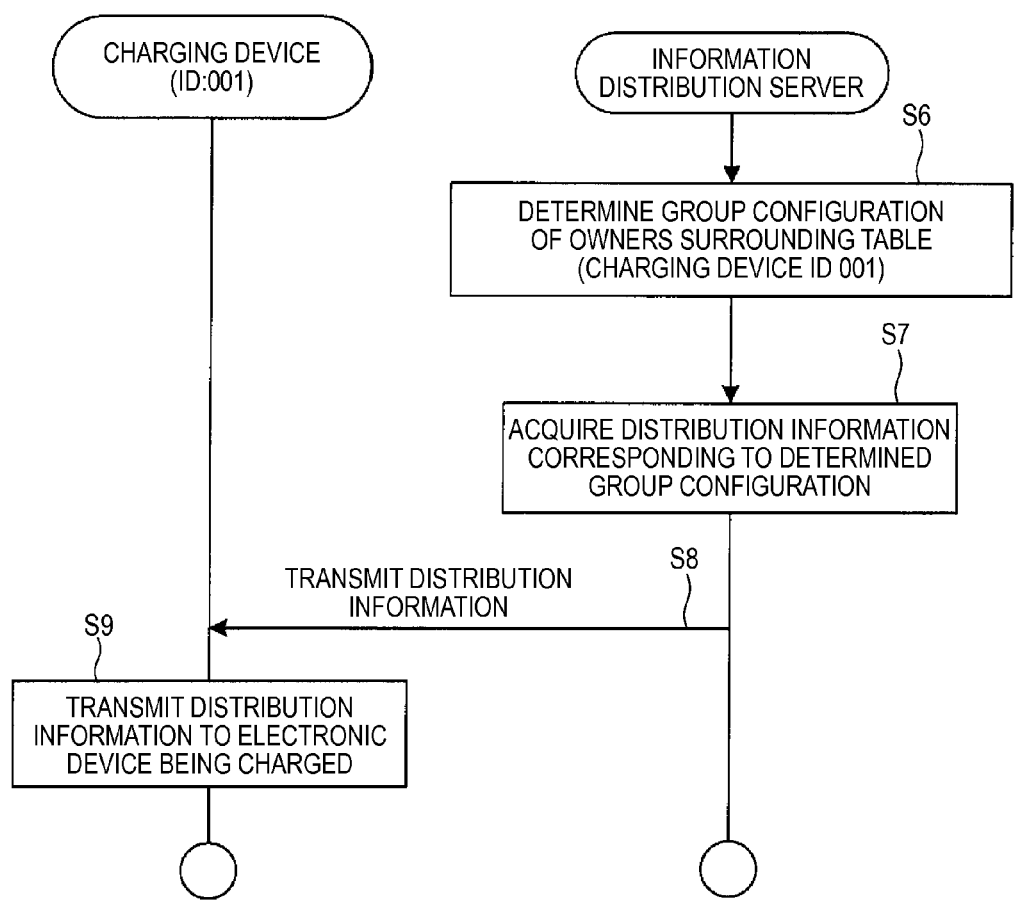
FIG. 7 is a sequence chart illustrating an operation after the information distribution server 50 updates information of the built-in memory (adds and deletes owner information).

FIG. 7 is a sequence chart illustrating an operation after the information distribution server 50 updates information in the built-in memory (adds and deletes owner information).

When the information distribution server 50 updates information in the built-in memory, the information distribution server determines whether or not a plurality of pieces of owner information are stored in a charging ID (herein, the ID 001) which has been subjected to the addition or deletion of owner information. When a plurality of pieces of owner information are not stored in the charging ID, the information distribution server stands by until the built-in memory is updated next. When a plurality of pieces of owner information are stored in the charging ID, the information distribution server 50 determines the configuration of a group constituted by all owners who are charging the electronic device 1 using the charging device 20 having the charging ID 001, by using owner information corresponding to the ID 001 (step S6).

For example, a case where new owner information is added to the ID 001 from a state where one piece of owner information is stored with respect to each of the ID 001 and the ID 002 is considered. In this case, the table of the built-in memory of the information distribution server 50 is as shown in FIG. 6. The sign "*" shown in FIG. 6** indicates owner information.

In the example of FIG. 6, the number of pieces of owner information corresponding to the ID 001 is two. For this reason, the information distribution server 50 determines a group configuration for owners who are charging the electronic device 1 using the charging device 20 having the ID 001, by using two pieces of owner information corresponding to the ID 001.

When the two pieces of owner information corresponding to the ID 001 are, for example, a man in his thirties and a woman in her forties, the information distribution server 50 determines that the group configuration corresponding to the ID 001 includes two members, a mixture of men and women, a middle age, and the same proportion of men and women.

In addition, the information distribution server 50 acquires distribution information corresponding to the determined group configuration from the database 40 (step S7). In the above-mentioned example, distribution information J5 is acquired as distribution information corresponding to the ID 001.

Next, the information distribution server 50 transmits the acquired distribution information with respect to the charging ID 001 to the charging device 20 having the charging ID 001 (step S8).

The control unit 22 of the charging device 20 having received the distribution information from the information distribution server 50 causes the distribution information to be transmitted to each of the plurality of electronic devices 1 which are being charged from the short-range wireless communication unit 24 (step S9).

Through the above-mentioned operation, the display units 13 of the respective plurality of electronic devices 1 placed on the same table 10 display distribution information having the same contents according to a group configuration of owners of the electronic device who are sitting around the table 10.

For example, when the group of the owners sitting around the table 10 is constituted by only women, information on a restaurant providing a delicious meal preferred by women can be distributed to all of the owners belonging to the group. Alternatively, when the group of the owners sitting around the table 10 is constituted by only men, information on a restaurant providing an all-you-can-eat service can be distributed to all of the owners belonging to the group.

According to this system, information suitable for a group configuration of owners surrounding a table is distributed, and thus it is possible to reduce a process and hardware (for example, the storage capacity of the database 40) necessary for determining information to be distributed and to lower cost required for the construction of the system, as compared with a system that distributes information suitable for individual owners.

In addition, according to this system, the owner of the electronic device 1 can obtain distribution information useful for himself or herself in order to charge the electronic device 1 for free. In addition, a system manager can distribute advertisement information and the like to many unspecified persons without increasing costs for constructing the system. In this manner, it is possible to realize a system which is useful for both a system user (owner of an electronic device) and a system manager.

Here, a case is assumed in which the fixed number of people at the table 10 is two and a group of three customers visit a store in which the table 10 is installed. In this case, two people sit at one of the two tables 10 and one person sits at the other. In addition, when three customers starts charging the respective electronic devices 1 at the table 10, a table stored in the built-in memory of the information distribution server 50 is as shown in FIG. 6. Accordingly, distribution information is transmitted to two electronic devices 1 charged by the charging device 20 having the ID 001, while a situation in which distribution information is not transmitted to one electronic device 1 charged by the charging device 20 having the ID 002 occurs.

Consequently, assuming such a situation, it is preferable that a function of grouping the plurality of charging devices 20 together be provided. Specifically, a configuration is adopted in which a grouping request signal for grouping the plurality of charging devices 20 together can be transmitted to the information distribution server 50.

For example, a portable terminal, introduced to a store, which can be connected to the network 30 is configured such that an operation of selecting a plurality of tables 10 to be grouped together, among the tables 10 located at the store, is performed to thereby transmit the grouping request signal for requesting the grouping of the plurality of charging devices 20 built in the plurality of selected tables 10 to the information distribution server 50.

Alternatively, a configuration may be adopted in which the grouping request signal for requesting the grouping of the plurality of charging devices 20 is transmitted to the information distribution server 50 by providing an operation unit in the charging device 20 (table 10) and operating the operation unit.

Figure 8:
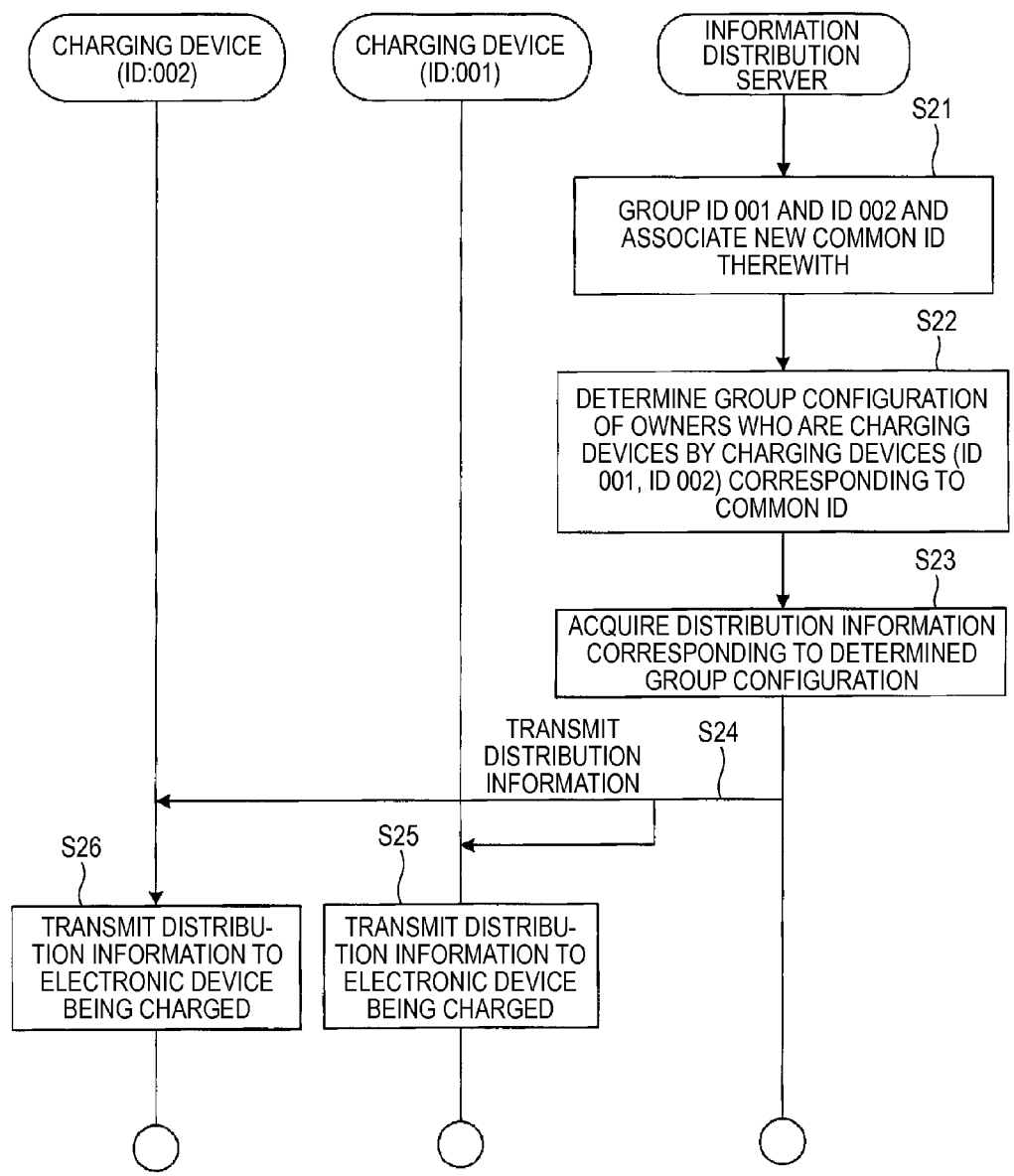
FIG. 8 is a sequence chart showing a modification example of an operation of the information distribution system 100 shown in FIG. 1.

FIG. 8 is a sequence chart showing a modification example of an operation of the information distribution system 100 shown in FIG. 1. FIG. 8 shows an operation when a grouping request signal is transmitted to the information distribution server 50. The processes of the information distribution server 50 shown in FIG. 8 are performed by the above-mentioned information distribution program executed by a processor.

When the information distribution server 50 receives the grouping request signal, the information distribution server groups the charging IDs of the plurality of designated charging devices 20 together in response to the reception of the grouping request signal (step S21).

For example, when a request for grouping the charging device 20 having the ID 001 and the charging device 20 having the ID 002 together is made, the information distribution server 50 performs grouping by associating the ID 001 and the ID 002 with a newly generated common ID in the table shown in FIG. 6.

When owner information corresponding to the common ID is updated in a state where the grouping is performed in step S21, the information distribution server 50 determines whether or not the number of pieces of owner information stored corresponding to the common ID is two or more. When the plurality of pieces of owner information are not stored, the information distribution server stands by until data of the built-in memory is updated next. On the other hand, when the plurality of pieces of owner information are stored corresponding to the common ID, the information distribution server 50 determines a group configuration of owners who are charging the electronic device 1 by the plurality of charging devices 20 corresponding to the common ID, by using the owner information corresponding to the common ID (step S22).

For example, it is assumed that the table of the built-in memory of the information distribution server 50 has been updated as shown in FIG. 6 in a state where the ID 001 and the ID 002 are grouped together.

In the example of FIG. 6, a total number of pieces of owner information corresponding to the ID 001 and the ID 002 is three. For this reason, the information distribution server 50 determines a group configuration of three owners who are charging the electronic device 1 using two charging devices 20 having the ID 001 and the ID 002 by using the three pieces of owner information corresponding to the ID 001 and the ID 002.

When two pieces of owner information corresponding to the ID 001 are, for example, a man in his thirties and a woman in her forties and one piece of owner information corresponding to the ID 002 is, for example, a man in his thirties, the information distribution server 50 determines that the group configuration corresponding to the common ID common to the ID 001 and the ID 002 includes three members, a mixture of men and women, a middle age, and a group having a relatively large number of men.

In addition, the information distribution server 50 acquires distribution information corresponding to the determined group configuration from the database 40 (step S23). In the above-mentioned example, distribution information J4 is acquired as distribution information corresponding to the common ID.

Next, the information distribution server 50 transmits the acquired distribution information corresponding to the common ID to two charging devices 20 having an ID corresponding to the common ID (step S24).

The control units 22 of two charging devices 20 having received the distribution information from the information distribution server 50 cause the distribution information to be transmitted to the electronic device 1 being charged from the short-range wireless communication unit 24 (step S25 and step S26).

With the above-mentioned system configuration even when a group of customers are divided into a plurality of tables 10 and sit, the group of customers are recognized as one group, and thus it is possible to distribute distribution information optimized for the group. Accordingly, even in a small store in which there is not a table having a large fixed number of people, this system can be introduced.

When a group of customers is divided into the plurality of tables 10 and sit, it is assumed that the customers move between the plurality of tables 10. Consequently, the information distribution server 50 may group the plurality of charging devices 20 together when the same electronic device 1 moves between the plurality of charging devices 20 regardless of the presence or absence of a grouping request signal.

Specifically, with regard to data of a table stored in the built-in memory of the information distribution server 50, the data for a predetermined period of time before updating the data remains as history. The latest data and the history data are compared with each other when updating the data to determine whether or not the same owner information has been stored corresponding to two charging device IDs within a predetermined period of time.

As a result of the determination, when the same owner information has been stored corresponding to two charging device IDs within a predetermined period of time, it is possible to determine that the two charging device IDs are being used by the same group of customers. Accordingly, in this case, the information distribution server 50 performs a process of grouping the two charging device IDs together.

In this manner, it is possible to improve the convenience of the system by enabling the plurality of charging devices 20 to be automatically grouped together without transmitting a grouping request signal to the information distribution server 50 manually.

A description has been made of an example in which the plurality of charging devices 20 are grouped together assuming the use of a group of customers. However, even in a situation where only one electronic device 1 is charged by each of the plurality of charging devices 20 (situation where only one customer is sitting at each table 10), it is effective to group the plurality of charging devices 20 together.

In a situation where only one customer is sitting at each table 10, distribution information is not provided to each customer as long as grouping is not performed, and thus advantages on the system introduction side are reduced.

Consequently, when there are a plurality of charging device IDs having only one piece of owner information stored therein at the time of updating the table stored in the built-in memory, the information distribution server 50 performs a process of grouping the plurality of charging device IDs together. A process after the grouping is as described in FIG. 8.

With such a configuration, even only one customer having visited a store can be provided with distribution information, and thus it is possible to prevent advantages on the system introduction side from being reduced.

Meanwhile, in a case where there are a plurality of charging device IDs having only one piece of owner information stored therein at the time of updating the table stored in the built-in memory, the information distribution server 50 may group the charging device IDs in which a difference in a charging start time between electronic devices being charged is equal to or less than a value which is determined in advance, among the plurality of charging device IDs.

In this case, the charging device 20 may transmit both the owner information and the charging start time to the information distribution server 50 in step S3 of FIG. 5, and the information distribution server 50 may record the time information in association with the charging device ID. Thus, it is possible to group customers seated at similar times and to distribute information to the customers.

In addition, when there are a plurality of charging device IDs having only one piece of owner information stored therein at the time of updating the table stored in the built-in memory, the information distribution server 50 may group the charging device IDs disposed at a distance equal to or less than a value which is determined in advance, among the plurality of charging device IDs.

In this case, positional information on the location of the charging device is recorded in the database 40 in association with the charging device ID. Thus, it is possible to group customers together seated at similar times and to distribute information to the customers.

Various modifications can be made to the information distribution system 100 mentioned above.

For example, the database 40 may be able to have access to data from the information distribution server 50, may be built in the information distribution server 50, and may be connected to the information distribution server 50 without going through the network 30.

In addition, the information distribution server 50 acquires owner information stored in the electronic device 1 through the charging device 20, but may directly acquire owner information from the electronic device 1 by mounting an interface to be connected to the network 30 on the electronic device 1.

In this case, the electronic device 1 acquires an ID of the charging device 20 built in the table 10 from the charging device 20 and transmits the ID to the information distribution server 50 together with the owner information. Thus, the information distribution server 50 can determine from which electronic device 1 placed on which charging device 20 the owner information acquired from the electronic device 1 has been transmitted.

In addition, the information distribution server 50 transmits the information acquired from the database 40 to the electronic device 1 through the charging device 20, but may directly distribute the information to the electronic device 1 from the information distribution server 50 by mounting an interface to be connected to the network 30 on the electronic device 1. In this case, the information distribution server 50 can distribute the information to the electronic device 1 by including an IP address of the electronic device 1, and the like in the owner information.

In addition, at least one charging device 20 may be used to operate the information distribution system 100.

In addition, more detailed information on an owner (for example, annual income, marital status, and the presence or absence of a boyfriend or girlfriend) may be included as owner information. Thus, it is possible to distribute advertisements appropriate for annual income, advertisements targeted to unmarried people, and the like as distribution information and to provide detailed information. The owner information may be stored by preparing a questionnaire in advance and answering the questionnaire.

As described above, the following matters are disclosed in this specification.

It is disclosed an information distribution method of distributing information to an electronic device including a battery charged through wireless power feeding, a display unit displaying information, and a wireless communication unit, the information distribution method comprising: an owner information acquisition step of causing a computer to acquire owner information on owners of electronic devices from the electronic devices, the electronic devices being charged by at least one charging device that includes a communication unit communicating with the wireless communication unit of the electronic device and a charging unit capable of charging the batteries of a plurality of the electronic devices through wireless power feeding; a group configuration determination step of causing the computer to determine a configuration of a group constituted by a plurality of owners who are charging the electronic devices by the same charging device, by using the owner information acquired from the electronic devices charged by the same charging device; an information acquisition step of causing the computer to acquire information corresponding to the determined configuration of the group from a storage unit that stores information according to a configuration of a group constituted by a plurality of owners; and an information transmission step of causing the computer to transmit the information acquired in the information acquisition step to the electronic devices charged by the same charging device.

It is disclosed the information distribution method, in which the computer acquires the owner information on the owners of the electronic devices charged by the charging device from the electronic devices through the charging device in the owner information acquisition step, and the computer transmits the information acquired in the information acquisition step to the electronic devices charged by the same charging device through the same charging device in the information transmission step.

It is disclosed the information distribution method, in which a plurality of the charging devices are used, the method further includes a grouping step of causing the computer to group the plurality of charging devices together; and the computer regards the plurality of grouped charging devices as the same charging device and determines the configuration of the group in the group configuration determination step.

It is disclosed the information distribution method, in which in the grouping step, the computer groups the plurality of charging devices together when the same electronic device moves between the plurality of charging devices.

It is disclosed the information distribution method, in which when there are a plurality of specific charging devices which are charging devices having one electronic device being charged, the computer groups the plurality of specific charging devices together in the grouping step.

It is disclosed the information distribution method, in which when there are a plurality of specific charging devices which are charging devices having one electronic device being charged, the computer groups the specific charging devices together in which a difference in a charging start time between the electronic devices being charged is equal to or less than a value which is determined in advance, among the plurality of specific charging devices, in the grouping step.

It is disclosed the information distribution method, in which when there are a plurality of specific charging devices which are charging devices having one electronic device being charged, the computer groups the specific charging devices together disposed at a distance equal to or less than a value which is determined in advance, among the plurality of specific charging devices, in the grouping step.

It is disclosed an information distribution program for causing a computer to perform the steps of the information distribution method.

It is disclosed an information distribution server used in a system that distributes information to an electronic device including a battery charged through wireless power feeding, a display unit displaying information, and a wireless communication unit, the information distribution server including: a computer that performs the steps of the information distribution method.

It is disclosed a charging device used in a system that distributes information to an electronic device including a battery charged through wireless power feeding, a display unit displaying information, and a wireless communication unit, by using at least one charger that includes a communication unit communicating with a wireless communication unit of the electronic device and a charging unit capable of charging the batteries of the plurality of electronic devices through wireless power feeding, the charging device including: a network communication unit that communicates with an information distribution server distributing the information through a network; an owner information acquisition unit that acquires owner information on owners of the plurality of electronic devices who charge the batteries from the electronic devices; an owner information transmission control unit that causes the plurality of pieces of acquired owner information to be transmitted to the information distribution server from the network communication unit; an information reception unit that receives information determined by the plurality of pieces of owner information from the information distribution server and an information transmission control unit that causes the received information to be transmitted to the plurality of electronic devices being charged from the communication unit.

INDUSTRIAL APPLICABILITY

According to the invention, it is possible to provide an information distribution method and program capable of providing information suitable for a user who charges an electronic device without increasing cost, and an information distribution server and a charging device which are used for the information distribution method.

The invention has been described through a specific embodiment. However, the invention is not limited to the embodiment, and various modifications can be made without departing from the scope of the invention.

This application is based on a Japanese patent application filed on Jul. 10, 2012 (Japanese Patent Application No. 2012-154705), the entire contents thereof being thereby incorporated by reference.

REFERENCE SIGNS LIST 100 information distribution system
1 electronic device
10 table
20 charging device
30 network
40 database
50 information distribution server

The invention claimed is:

1. An information distribution method of distributing information to an electronic device including a battery charged through wireless power feeding, a display unit displaying information, and a wireless communication unit, the information distribution method comprising:
   an owner information acquisition step of causing a computer to acquire owner information on owners of electronic devices from the electronic devices via at least one charging device, the electronic devices being charged by the at least one charging device that includes a communication unit communicating with the wireless communication unit of the electronic device and a charging unit capable of charging the batteries of a plurality of the electronic devices through wireless power feeding;
   a group configuration determination step of causing the computer to determine a configuration of a group constituted by a plurality of owners who are charging the electronic devices by the same charging device, by determining which of a plurality of group configurations recorded in advance in a database is met by the owner information acquired from the electronic devices charged by the same charging device, the plurality of group configurations being divided based on at least one of a number of owners and a ratio of men to women of the number of owners;
   an information acquisition step of causing the computer to acquire information corresponding to the determined configuration of the group from a storage unit that stores information according to a configuration of a group constituted by a plurality of owners; and
   an information transmission step of causing the computer to transmit the information acquired in the information acquisition step to the electronic devices charged by the same charging device.

2. The information distribution method according to claim 1,
   wherein the computer acquires the owner information on the owners of the electronic devices charged by the charging device from the electronic devices through the charging device in the owner information acquisition step, and
   the computer transmits the information acquired in the information acquisition step to the electronic devices charged by the same charging device through the same charging device in the information transmission step.

3. The information distribution method according to claim 1,
wherein a plurality of the charging devices are used,
the method further comprises a grouping step of causing the computer to group the plurality of charging devices together, and
the computer regards the plurality of grouped charging devices as the same charging device and determines the configuration of the group in the group configuration determination step.

4. The information distribution method according to claim 3, wherein in the grouping step, the computer groups the plurality of charging devices together when the same electronic device moves between the plurality of charging devices.

5. The information distribution method according to claim 3, wherein when there are a plurality of specific charging devices which are charging devices having one electronic device being charged, the computer groups the plurality of specific charging devices together in the grouping step.

6. The information distribution method according to claim 3, wherein when there are a plurality of specific charging devices which are charging devices having one electronic device being charged, the computer groups the specific charging devices together in which a difference in a charging start time between the electronic devices being charged is equal to or less than a value which is determined in advance, among the plurality of specific charging devices, in the grouping step.

7. The information distribution method according to claim 3, wherein when there are a plurality of specific charging devices which are charging devices having one electronic device being charged, the computer groups the specific charging devices together disposed at a distance equal to or less than a value which is determined in advance, among the plurality of specific charging devices, in the grouping step.

8. An information distribution server used in a system that distributes information to an electronic device including a battery charged through wireless power feeding, a display unit displaying information, and a wireless communication unit, the information distribution server comprising:
a computer that performs the steps of the information distribution method according to claim 1.

* * * * *